March 11, 1969     E. M. JOST     3,432,354

ELECTROCHEMICAL POWER SUPPLY WITH MOVABLE ANODE MATERIAL

Filed Aug. 15, 1966

Ernest M. Jost,
Inventor.
Koenig, Senniger, Powers and Leavitt,
Attorneys.

United States Patent Office 3,432,354
Patented Mar. 11, 1969

3,432,354
ELECTROCHEMICAL POWER SUPPLY WITH MOVABLE ANODE MATERIAL
Ernest M. Jost, Plainville, Mass., assignor to Texas Instruments Incorporated, Dallas, Tex., a corporation of Delaware
Filed Aug. 15, 1966, Ser. No. 572,506
U.S. Cl. 136—86                16 Claims
Int. Cl. H01m 29/02, 15/02

ABSTRACT OF THE DISCLOSURE

Electrochemical power supplies are described each of which includes a body of aqueous electrolyte, an electrically conductive cathode, a supply of elongate electrically conductive porous anode material and means for moving this anode material relative to the cathode and through the aqueous electrolyte.

---

This invention relates to electrochemical power supply systems, and more particularly to electrochemical power supplies and methods for producing electrical energy in which anode material is moved relative to the cathode and through a body of an aqueous electrolyte.

Among the several objects of the invention may be noted the provision of electrochemical power supplies which have high energy density (at least approximately 50 watt hours/lb.) on a weight basis and will operate at high current densities; the provision of such power supplies in which the energy required to effect relative movement of the anode and cathode is quite small; the provision of power supplies of the type described which have low internal resistances and are capable of high discharge rates; the provision of power supply cells which will operate effectively over a wide range of temperatures, and in which explosion hazards are eliminated; the provision of such power supplies which are efficient in terms of the ratio of discharge energy to charging energy and are conveniently rechargeable for use over many cycles of operation; the provision of power supplies of the type described which are unharmed by high rates of charge or discharge, or by long periods of standing in a charged or uncharged condition; the provision of power supplies which are both compact and versatile in use; and the provision of methods for electrochemically producing electrical energy which are simple, economical and efficient. Other objects and features will be in part apparent and in part pointed out hereinafter.

The invention accordingly comprises the construction and methods hereinafter described, the scope of the invention being indicated in the following claims.

Figure 1:
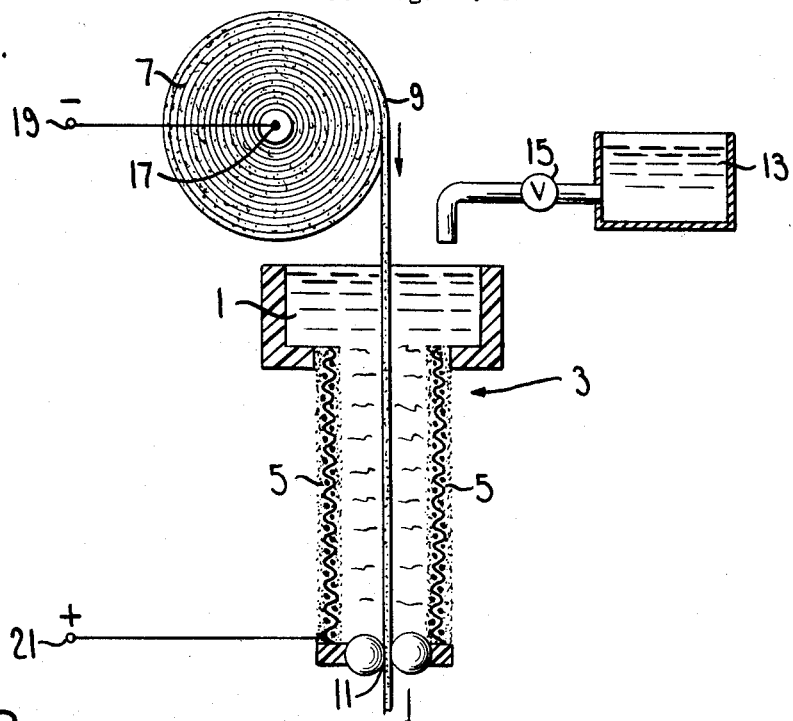
Figure 2:
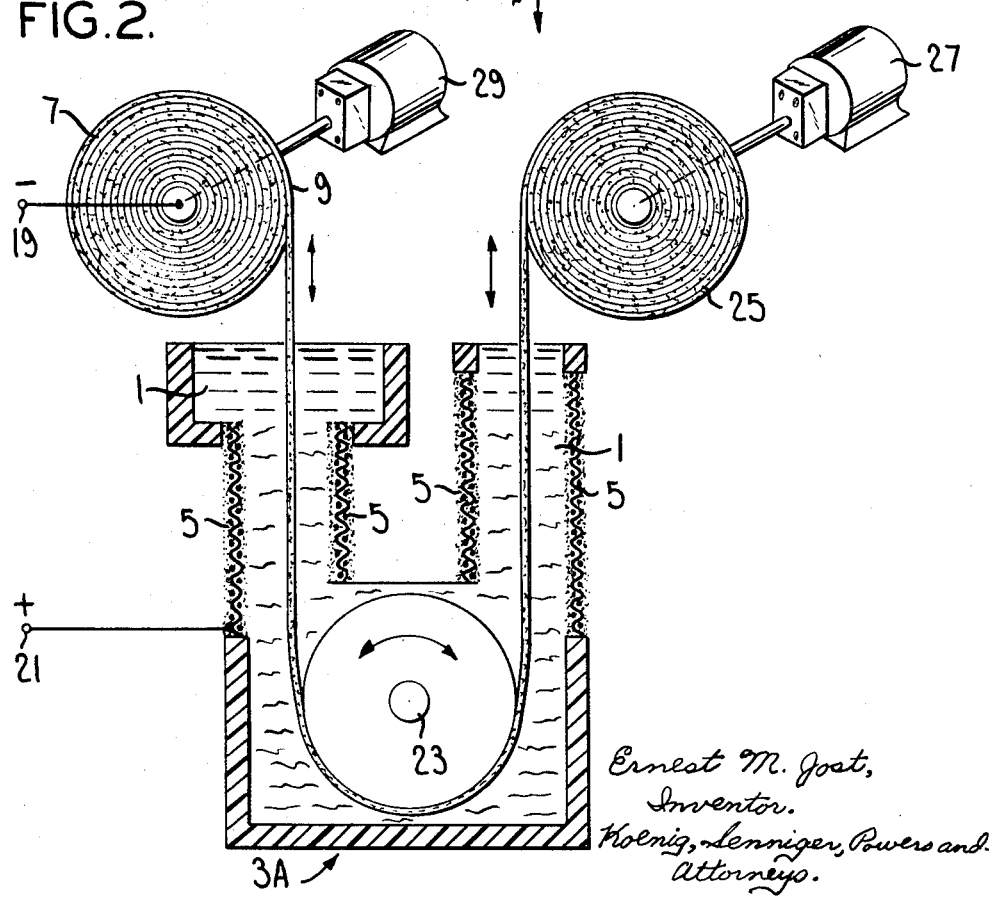

In the accompanying drawings, in which several of various possible embodiments of the invention are illustrated, FIGS. 1 and 2 are schematic views of two different power supply embodiments of the present invention.

Corresponding reference characters indicate corresponding parts throughout the several views of the drawings.

In my copending application Ser. No. 535,452, filed Mar. 18, 1966, high energy density electrochemical power supplies were disclosed. These supplies represent a marked departure from generally accepted conventional electrochemical cell concepts and technology by emphasizing energy density-volumetric considerations in the selection of anode materials; in utilizing as a cathode and air electrode; in having the total projected area of the anode in contact with the electrolyte at least equal, and preferably several times as great as, the total projected area of the cathode contacting the electrolyte; and in having the total developed area of the anode in contact with the electrolyte at least approximately ten times, and preferably many times (e.g., 100,000 or more), that of the cathode in contact with the electrolyte. The term projected area means the total superficial or extrinsic area of electrode contacted by the electrolyte disregarding the exterior and interior characteristics of the porous electrode structures. The expression total developed area refers to the total active or intrinsic area of electrode contacted by the electrolyte taking the porous nature of the electrode structure into consideration. In a conventional cell the total projected area of the anode is substantially equal to that of the cathode, and the total developed area of one electrode is at best only a few times greater than that of the other electrode. In the aforesaid application the stored electrochemical capacity of the anode is many times greater than that of the cathode, again in sharp contrast with conventional cells in which the stored electrochemical capacities of the anode and cathode are substantially of the same order.

In accordance with the present invention, the anode and cathode components and relationships of the aforesaid application are utilized, as well as other anode materials, in providing electrochemical power supply systems in which the anode material is moved relative to the cathode and through a body of aqueous electrolyte to operate at high current densities over extended periods of time. These power supplies may be operated as a primary cell, or as a secondary cell in which event means for recharging the supply is provided.

Briefly, the invention in its broader aspects relates to electrochemical power supplies which include a body of aqueous electrolyte and an electrically conductive cathode permeable to the passage of air and oxygen therethrough while being substantially impermeable to the passage of electrolyte. The cathode has a surface in electrolytic contact with the electrolyte and an opposite surface exposed to an oxygen-containing gas. The anode is constituted by a supply of an elongate electrically conductive porous anode material, e.g., in the form of a tape. Means are provided for moving the anode material relative to said cathode and through said aqueous electrolyte. These supplies also include electrical terminal means for electrically connecting an electrical load to the anode material and the cathode. The methods of the present invention for electrochemically producing electrical energy include the steps of moving a supply of elongate electrically conductive porous anode material through a body of aqueous electrolyte in electrolytic contact with at least one surface of an electrically conductive cathode permeable to the passage of air and oxygen and substantially impermeable to the passage of electrolyte, while exposing an opposite surface of the cathode to a source of oxygen-containing gas, and maintaining electrical contact between the terminals of an electrical load and the anode material and the cathode respectively.

More specifically the novel electrochemical power supply systems of this invention employ metal-air couples or cells in which the cathodes, or positive polarity electrodes, are microporous or permeable to air and oxygen but not to aqueous alkaline or acid electrolytes. These air electrodes or cathodes are quite thin, preferably in the order of 5–25 mils. Exemplary useful air electrodes are disclosed, for example, in the aforesaid application, and are commercially available under the trade designations AA–1, AB–4, AB–6 and AB–X from American Cyanamid Co. of Stamford, Connecticut. These air electrodes have a capacity which is practically infinite, i.e., the capacity of a cell using such a cathode can be increased by increasing the available anode material in contact with the electrolyte and providing sufficient oxygen at the cathode, such as by a forced air supply.

The anode, sometimes referred to as a counterelectrode, is therefore the principal significant limiting factor in increasing the capacity of these power supply cells. If conventional practice in battery technology were followed and the facing or total projected areas and developed areas of the anode and cathode were made substantially the same, the capacity of such a cell would not be fully realized. To increase the surface area of the anode or counterelectrode by increasing the thickness of a porous anode has distinct limitations due to concentration polarization and the rate of diffusion of the conducting ions in and out of the counterelectrode. It is preferred to keep the diffusion paths quite small and the maximum thickness of the counterelectrode in the order of about 100 mils and preferably about 50 mils. Thus the anode of the power supplies of the present invention preferably has a projected area in contact with the electrolyte which is at least equal to the electrolyte-contacting area of the air cathode and a developed area which is many times greater than that of the cathode.

The metals useful as anodes or counterelectrodes of this invention may be of two types, depending on whether a secondary or rechargeable power supply is desired, or whether a nonrechargeable supply is satisfactory. In both types of systems the anodes preferably have high volumetric energy density characteristics, but in rechargeable systems of this invention the anode should also possess desirable characteristics relative to solubility and corrosion factors in an aqueous electrolyte. Zinc, for example, which is suitable for primary or nonrechargeable type supplies of this invention, is not suitable from these aspects for a rechargeable system; nor is any metal which has a solubility in the aqueous electrolyte which is not less than that of zinc. Also, metals which have EMF's more negative than that of zinc (approximately $-1.25$ v. in an alkaline electrolyte relative to a standard hydrogen electrode) are not satisfactory for the systems of this invention because of their corrosion propensities during electrochemical reaction wherein a portion of the coulombic efficiency is lost in chemical corrosion reactions rather than in a power producing electron exchange reaction. On the other hand, metals less negative than $-0.5$ v. relative to the standard hydrogen electrode in alkaline systems generally would not be suitable because of the resulting low energy densities. In accordance with this invention the power supply anodes for the rechargeable systems of this invention include cadmium, cobalt, iron, vanadium, chromium and tungsten. These anodes are porous and may include an electrically conductive grid or mesh of an inactive metal, such as nickel, supporting the active anode material, or these anodes may be self-supporting.

The electrolyte may either be an aqueous alkaline or acidic solution having a concentration of between about 5–50% by weight and preferably about 20–30%. Examples of alkaline electrolytes include alkali hydroxides such as potassium, sodium and lithium hydroxides, while exemplary acidic electrolytes include sulphuric, phosphoric, nitric and hydrochloric acids.

The power supplies of this invention produce electrical energy by electrochemical reactions involving, during discharge of the cell, the oxidation of the anode metal at the anode or counterelectrode-electrolyte interface. Concurrently, the oxygen molecules supplied from air or oxygen diffusing through the air permeable cathode are reduced, e.g., to hydroxyl ions in alkaline systems which migrate toward the anode, free electrons being supplied through an electrically conductive external load circuit by electric current flow from cathode to anode. During discharge therefore metal hydroxide is formed at the anode and water is simultaneously being consumed with the concurrent consumption of oxygen at the cathode. During charging of the rechargeable supplies disclosed herein, the anode metal is formed for redeposit on the anode and oxygen is produced at the cathode. The oxidation reaction in an alkaline environment at the anode is represented by:

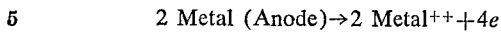
2 Metal (Anode)→2 Metal$^{++}$+4$e$

While the reduction reaction at the cathode is:

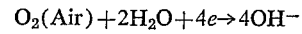
O$_2$(Air)+2H$_2$O+4$e$→4OH$^-$

The overall charge and discharge reaction of the cell is:

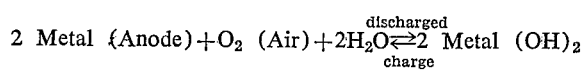
$$2 \text{ Metal (Anode)} + O_2 \text{ (Air)} + 2H_2O \underset{\text{charge}}{\overset{\text{discharged}}{\rightleftharpoons}} 2 \text{ Metal (OH)}_2$$

Similar reaction formulas are well known for acidic system and will not be given.

It will be noted that the reaction at the cathode during discharge involves reduction of each molecule of oxygen to four hydroxyl ions and the utilization of all four electrons, rather than the partial reduction of oxygen molecules to perhydroxyl ions wherein the O$_2$ bond is not split and which involves the utilizing of only two of the four available oxygen electrons. The latter reaction, therefore, utilizes only one-half the possible coulombic efficiency while the former utilizes substantially the entire coulombic efficiency. This hydroxyl mechanism at the cathodes of these novel electrochemical power supplies is effected by the presence of a catalyst at the cathode-electrolyte interface which promotes or utilizes the full use of oxygen, i.e., the reduction of oxygen to hydroxyl. Such catalysts are of the platinum type, viz., platinum black particles which are supported on thin screens or grids of inactive metal bonded and waterproofed with a synthetic resin (e.g., tetrafluoroethylene polymers or other useful polymeric synthetic resin materials such as polyethylene, polypropylene, polystyrene, polyacrylontrile and polyvinylchloride) air or oxygen-permeable membrane which is substantially impermeable to the aqueous electrolyte. The Faraday or coulombic efficiency of these power supply units is quite high. For example, a cell of the present invention will have a coulombic efficiency of at least 60–70%. The catalyst material may be extended by use of certain other finely divided material such as boron and/or titanium carbides.

Referring now more particularly to FIG. 1, an exemplary electrochemical power supply of the present invention comprises a body of an aqueous electrolyte 1 in a chamber 3, in which a cathode 5 constitutes at least a portion of the chamber walls. As described above, cathode 5 is an electrically conductive material permeable to the passage of air or oxygen therethrough while being substantially impermeable to the passage of electrolyte. Typically the electrode constituting cathode 5 comprises a platinum black catalyst supported in a synthetic resin membrane bonded to a fine mesh screen of a metal such as nickel or tantalum, and is about 6–7 mils in thickness, and carries 5–10 grams of platinum black per square foot. The inner surface of cathode 5 is in electrolytic contact with the aqueous electrolyte while the outer cathode surface is exposed to oxygen or any oxygen-containing gas, such as air, at a pressure at least equal to ambient atmospheric pressure. A supply coil 7 of electrically conductive porous anode material 9 in tape or other elongate physical form is positioned adjacent the chamber 3 for movement through the length of the chamber. A sliding liquid seal 11 is provided at the lower portion of chamber 3.

The porous anode tape material may be formed of particles of zinc, iron, cobalt, etc. powder sintered to a supporting mesh, the fabrication of such porous anode material being described in further detail in my aforesaid copending application and in my other copending applications Ser. No. 368,055, filed May 18, 1964, and Ser. No. 504,604, filed Oct. 24, 1965.

It is to be noted that the projected area of the cathode 5 in contact with the electrolyte may be much less than the projected area of the anode 9 in contact with the electrolyte. Also, because of the coiled characteristics of the anode 9, the developed area of the anode which will contact the electrolyte can be as many times greater than that of the cathode as desired.

It is preferred that the anode material have its pores carry particles of the electrolyte, such as potassium hydroxide, in dry particulate form. Such anode material when moved through a body of water will form an adequately concentrated aqueous electrolyte. The inclusion of the electrolyte in the supply of anode material is particularly advantageous since during discharge hydroxyl ions are consumed at the anode to form metal hydroxide and thus under normal circumstances the electrolyte immediately adjacent the anode becomes more dilute as the discharge reaction continues. However, where the electrolyte in dry form is carried by the anode, its dissolution thus replenishes the depleted hydroxyl ion and provides a concentration profile which is highly desirable.

A reservoir 13 of water with a valve 15 is provided for replenishing or adjusting the concentration of the electrolyte during operation of this power supply when the anode material carries the electrolyte in dry form. Any conventional type of static contact is provided at 17 for providing a continuous high conductivity electrical connection of the anode material to a negative power supply terminal 19. A positive power supply terminal 21 is interconnected to cathode 5. A customary electrical load may then be energized by interconnection to these terminals 19 and 21. Any conventional means such as a small electrical motor and drive (not shown) is employed to move the anode material through the chamber of aqueous electrolyte and to control the speed of travel, if desired, to a value which is a function of the load demand, e.g., an increase in speed of travel in response to an increase in load current. It will be noted that the energy required to move the tape through the electrolyte is minimal and may be conveniently supplied from the power supply with little parasitic loading effect. Moreover, as the solvent water does not have to be stored and the negative tape electrode is the only component that would eventually need replacing, the power supply systems of this invention are quite compact in size and have great versatility of use.

Referring now to FIG. 2, a second exemplary embodiment of this invention is shown to comprise a generally U-shaped chamber 3A rather than a generally vertical chamber as illustrated in FIG. 1. By using such a chamber configuration and a tape roller 23, the use of a sliding seal is eliminated. A take-up coil 25 is mechanically powered by a drive unit 27 to move the anode tape material 9 through the body of aqueous electrolyte 1 at a suitable desired rate of travel. For rechargeable systems of the present invention, a second drive unit 29 is also provided to rewind the tape anode material 7 onto the pay-off reel, recharging being effected as used anode tape 9 is returned through the chamber by connecting a D.C. supply source of appropriate potential to terminals 19 and 21.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:
1. An electrochemical power supply comprising:
a body of aqueous electrolyte;
an electrically conductive cathode permeable to the passage of air and oxygen therethrough while being substantially impermeable to the passage of electrolyte, said cathode having a surface in electrolytic contact with said electrolyte and an opposite surface exposed to oxygen-containing gas;
a supply of elongate electrically conductive porous anode material;
means for moving said anode material relative to said cathode and through said aqueous electrolyte; and
electrical terminal means respectively electrically connected to said anode material and said cathode for interconnection to an electrical load.

2. An electrochemical power supply as set forth in claim 1 in which the porous anode material also includes particles of the electrolyte in solid form.

3. An electrochemical power supply as set forth in claim 1 in which the cathode comprises a catalyst for reducing oxygen molecules to four hydroxyl ions.

4. An electrochemical power supply as set forth in claim 3 in which the total developed reactive area of the anode material in contact with the aqueous electrolyte is at least ten times that of the cathode in contact with the aqueous electrolyte, the thickness of said cathode being not substantially greater than approximately 25 mils, the thickness of the anode material being not substantially greater than approximately 100 mils.

5. An electrochemical power supply as set forth in claim 1 in which said anode material comprises a metal which has a solubility less than that of zinc in an alkaline electrolyte during electrochemical action and an electrochemical potential less negative than that of zinc in an alkaline solution.

6. An electrochemical power supply as set forth in claim 5 in which the total projected area of the anode material in contact with said electrolyte is at least equal to the total projected area of the cathode in contact with said eletrcolyte, and the total developed area of the anode material in contact with the electrolyte is at least approximately ten times that of the cathode in contact with the electrolyte.

7. An electrochemical power supply as set forth in claim 5 in which the anode comprises a metal selected from the group consisting of cadmium, cobalt, iron, vanadium, chromium and tungsten, and in which the cathode comprises a platinum type catalytic material.

8. An electrochemical power supply as set forth in claim 1 in which the anode material comprises zinc.

9. An electrochemical power supply as set forth in claim 1 in which air is supplied to said opposite cathode surface at a pressure at least equal to ambient atmospheric pressure.

10. An electrochemical power supply as set forth in claim 1 in which said body of electrolyte is contained in a chamber at least one surface portion of which is constituted by said cathode.

11. An electrochemical power supply as set forth in claim 10 in which said chamber is generally U-shaped.

12. An electrochemical power supply as set forth in claim 2 which further includes means for adding water to said aqueous electrolyte body as the porous solid electrolyte-containing anode material is moved therethrough.

13. An electrochemical power supply as set forth in claim 1 which further includes means for controlling the rate of travel of said anode material through said electrolyte body as a function of the electrical load demand.

14. An electrochemical power supply as set forth in claim 1 which further includes means for reversing the direction of travel of said anode material through said aqueous electrolyte body, and means for interconnecting a source of electrical power to said terminals whereby the power supply is recharged for subsequent reuse.

15. An electrochemical power supply comprising:
a body of aqueous electrolyte;
an electrically conductive cathode permeable to the passage of air and oxygen therethrough while being substantially impermeable to the passage of electrolyte, said cathode having a surface in electrolytic contact with said electrolyte and an opposite surface exposed to a source of oxygen-containing gas, said cathode comprising a platinum type catalytic material for reducing oxygen molecules to four hydroxyl ions, the thickness of said cathode being not substantially greater than approximately 25 mils;

a supply of electrically conductive porous anode material in tape form, the thickness of the anode material being not substantially greater than approximately 100 mils, the total projected area of the anode material in contact with said electrolyte being at least as great as the total projected area of the cathode in contact with said electrolyte, the total developed area of the anode in contact with the electrolyte being at least approximately ten times that of the cathode in contact with the electrolyte;

means for moving said anode material relative to said cathode and through said aqueous electrolyte; and electrical terminal means respectively electrically connected to said anode material and said cathode for interconnection to an electrical load.

16. An electrochemical power supply as set forth in claim 15 in which said porous anode material also includes particles of the electrolyte in solid form, said body of electrolyte being contained in a chamber at least one surface portion of which is constituted by said cathode, and means for adding water to said aqueous electrolyte body as the porous solid electrolyte-containing anode material is moved therethrough.

References Cited

UNITED STATES PATENTS

| | | | |
|---|---|---|---|
| 2,925,455 | 2/1960 | Eidensohn et al. | 136—86 |
| 3,043,898 | 7/1962 | Miller et al. | 136—86 |
| 3,057,946 | 10/1962 | Eidensohn | 136—86 |
| 3,260,620 | 7/1966 | Gruber | 136—86 |
| 3,293,080 | 12/1966 | Gruber et al. | 136—86 |

ALLEN B. CURTIS, *Primary Examiner.*

U.S. Cl. X.R.

136—136